(12) United States Patent
Carter et al.

(10) Patent No.: US 12,100,288 B2
(45) Date of Patent: Sep. 24, 2024

(54) CALIBRATION TECHNIQUES IN HAPTIC SYSTEMS

(71) Applicant: Ultrahaptics IP Ltd, Bristol (GB)

(72) Inventors: Thomas Andrew Carter, Bristol (GB); Benjamin John Oliver Long, Bristol (GB)

(73) Assignee: ULTRAHAPTICS IP LTD, Brisol (GB)

( * ) Notice: Subject to any disclaimer, the term of this patent is extended or adjusted under 35 U.S.C. 154(b) by 0 days.

(21) Appl. No.: 18/359,951

(22) Filed: Jul. 27, 2023

(65) Prior Publication Data
US 2024/0021072 A1 Jan. 18, 2024

Related U.S. Application Data

(60) Continuation of application No. 17/080,840, filed on Oct. 27, 2020, now Pat. No. 11,727,790, which is a
(Continued)

(51) Int. Cl.
*H04B 3/36* (2006.01)
*G06F 3/01* (2006.01)
(Continued)

(52) U.S. Cl.
CPC ............. *G08B 29/20* (2013.01); *G06F 3/016* (2013.01); *G06F 3/043* (2013.01); *G08B 6/00* (2013.01); *G10K 11/32* (2013.01); *G10K 11/34* (2013.01)

(58) Field of Classification Search
CPC ........... G08B 29/20; G08B 6/00; G06F 3/016; G06F 3/043; G10K 11/32; G10K 11/34
(Continued)

(56) References Cited

U.S. PATENT DOCUMENTS

| 4,218,921 A | 8/1980 | Berge |
| 4,760,525 A | 7/1988 | Webb |

(Continued)

FOREIGN PATENT DOCUMENTS

| CA | 2470115 A1 | 6/2003 |
| CA | 2909804 A1 | 11/2014 |

(Continued)

OTHER PUBLICATIONS

Notice of Allowance dated Feb. 23, 2023 for U.S. Appl. No. 18/060,556 (pp. 1-10).

(Continued)

*Primary Examiner* — Naomi J Small
(74) *Attorney, Agent, or Firm* — Koffsky Schwalb LLC; Mark I. Koffsky

(57) ABSTRACT

A system providing various improved calibration techniques for haptic feedback is described. An acoustic field is defined by one or more control points in a space within which the acoustic field may exist. Each control point is assigned an amplitude value equating to a desired amplitude of the acoustic field at the control point. Because complete control of space is not possible, controlling the acoustic field at given points yields erroneous local maxima in the acoustic field levels at other related positions. In relation to mid-air haptic feedback, these can interfere in interactions with the space by creating secondary effects and ghost phenomena that can be felt outside the interaction area. The level and nature of the secondary maxima in the acoustic field is determined by how the space is controlled. By arranging the transducer elements in different ways, unwanted effects on the acoustic field can be limited and controlled.

20 Claims, 14 Drawing Sheets

Related U.S. Application Data division of application No. 15/210,661, filed on Jul. 14, 2016, now Pat. No. 10,818,162.

(60) Provisional application No. 62/275,030, filed on Jan. 5, 2016, provisional application No. 62/275,206, filed on Jan. 5, 2016, provisional application No. 62/193,180, filed on Jul. 16, 2015.

(51) Int. Cl.
   *G06F 3/043* (2006.01)
   *G08B 6/00* (2006.01)
   *G08B 29/20* (2006.01)
   *G10K 11/32* (2006.01)
   *G10K 11/34* (2006.01)

(58) Field of Classification Search
   USPC .................................................. 340/407.1
   See application file for complete search history.

(56) References Cited

U.S. PATENT DOCUMENTS

| | | |
|---|---|---|
| 4,771,205 A | 9/1988 | Mequio |
| 4,881,212 A | 11/1989 | Takeuchi |
| 5,122,993 A | 6/1992 | Hikita |
| 5,226,000 A | 7/1993 | Moses |
| 5,235,986 A | 8/1993 | Maslak |
| 5,243,344 A | 9/1993 | Kouloupoulos |
| 5,329,682 A | 7/1994 | Thurn |
| 5,371,834 A | 12/1994 | Tawel |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,729,694 A | 3/1998 | Holzrichter |
| 5,859,915 A | 1/1999 | Norris |
| 6,029,518 A | 2/2000 | Oeftering |
| 6,193,936 B1 | 2/2001 | Gardner |
| 6,216,538 B1 | 4/2001 | Yasuda |
| 6,436,051 B1 | 8/2002 | Morris |
| 6,503,204 B1 | 1/2003 | Sumanaweera |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,497,662 B2 | 3/2009 | Mollmann |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,351,646 B2 | 1/2013 | Fujimura |
| 8,369,973 B2 | 2/2013 | Risbo |
| 8,594,350 B2 | 11/2013 | Hooley |
| 8,607,922 B1 | 12/2013 | Werner |
| 8,782,109 B2 | 7/2014 | Tsutsui |
| 8,823,674 B2 | 9/2014 | Birnbaum |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,667,173 B1 | 5/2017 | Kappus |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,936,908 B1 | 4/2018 | Acosta |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 | 6/2019 | Sinha |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,520,252 B2 | 12/2019 | Momen |
| 10,523,159 B2 | 12/2019 | Megretski |
| 10,531,212 B2 | 1/2020 | Long |
| 10,535,174 B1 | 1/2020 | Rigiroli |
| 10,569,300 B2 | 2/2020 | Hoshi |
| 10,593,101 B1 | 3/2020 | Han |
| 10,599,434 B1 | 3/2020 | Barrett |
| 10,657,704 B1 | 5/2020 | Han |
| 10,685,538 B2 | 6/2020 | Carter |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 10,991,074 B2 | 4/2021 | Bousmalis |
| 11,048,329 B1 | 6/2021 | Lee |
| 11,080,874 B1 | 8/2021 | Bardagjy |
| 11,098,951 B2 | 8/2021 | Kappus |
| 11,106,273 B2 | 8/2021 | Hazra |
| 11,113,860 B2 | 9/2021 | Rigiroli |
| 11,125,866 B2 | 9/2021 | Sumi |
| 11,169,610 B2 | 11/2021 | Sarafianou |
| 11,189,140 B2 | 11/2021 | Long |
| 11,204,644 B2 | 12/2021 | Long |
| 11,276,281 B2 | 3/2022 | Carter |
| 11,350,909 B2 | 6/2022 | Maresca |
| 11,531,395 B2 | 12/2022 | Kappus |
| 11,543,507 B2 | 1/2023 | Carter |
| 11,550,395 B2 | 1/2023 | Beattie |
| 11,550,432 B2 | 1/2023 | Carter |
| 11,553,295 B2 | 1/2023 | Kappus |
| 11,693,113 B2 | 7/2023 | Bachmann |
| 11,714,492 B2 | 8/2023 | Carter |
| 11,715,453 B2 | 8/2023 | Kappus |
| 11,727,790 B2 | 8/2023 | Carter |
| 11,740,018 B2 | 8/2023 | Kappus |
| 11,742,870 B2 | 8/2023 | Long |
| 11,768,540 B2 | 9/2023 | Long |
| 11,816,267 B2 | 11/2023 | Kappus |
| 11,842,517 B2 | 12/2023 | Lyons |
| 11,886,639 B2 | 1/2024 | Brown |
| 11,921,928 B2 | 3/2024 | Iodice |
| 11,955,109 B2 | 4/2024 | Long |
| 2001/0007591 A1 | 7/2001 | Pompei |
| 2001/0033124 A1 | 10/2001 | Norris |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |

(56) References Cited

U.S. PATENT DOCUMENTS

| | | |
|---|---|---|
| 2004/0226378 A1 | 11/2004 | Oda |
| 2004/0264707 A1 | 12/2004 | Yang |
| 2005/0052714 A1 | 3/2005 | Klug |
| 2005/0056851 A1* | 3/2005 | Althaus ............... H01L 31/0203 257/432 |
| 2005/0148874 A1 | 7/2005 | Brock-Fisher |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0056374 A1 | 3/2007 | Andrews |
| 2007/0094317 A1 | 4/2007 | Wang |
| 2007/0177681 A1 | 8/2007 | Choi |
| 2007/0214462 A1 | 9/2007 | Boillot |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |
| 2008/0130906 A1 | 6/2008 | Goldstein |
| 2008/0152191 A1 | 6/2008 | Fujimura |
| 2008/0226088 A1 | 9/2008 | Aarts |
| 2008/0273723 A1 | 11/2008 | Hartung |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Vitek |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1* | 4/2013 | McElveen ............... H04S 3/002 381/123 |
| 2013/0173658 A1 | 7/2013 | Adelman |
| 2013/0271397 A1 | 10/2013 | Macdougall |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0192995 A1 | 7/2015 | Subramanian |
| 2015/0209564 A1 | 7/2015 | Lewin |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0309629 A1 | 10/2015 | Amariutei |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1 | 8/2016 | Carter |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0358477 A1 | 12/2016 | Ansari |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1* | 5/2017 | Eid ........................ G06F 3/017 |
| 2017/0140552 A1 | 5/2017 | Woo |
| 2017/0144190 A1 | 5/2017 | Hoshi |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1 | 7/2017 | Long |
| 2017/0193823 A1 | 7/2017 | Jiang |

(56) References Cited

U.S. PATENT DOCUMENTS

| | | | |
|---|---|---|---|
| 2017/0211022 A1 | 7/2017 | Reinke | |
| 2017/0236506 A1 | 8/2017 | Przybyla | |
| 2017/0249932 A1 | 8/2017 | Maxwell | |
| 2017/0270356 A1 | 9/2017 | Sills | |
| 2017/0279951 A1 | 9/2017 | Hwang | |
| 2017/0336860 A1* | 11/2017 | Smoot | G06F 3/016 |
| 2017/0366908 A1 | 12/2017 | Long | |
| 2018/0035891 A1 | 2/2018 | Van Soest | |
| 2018/0039333 A1 | 2/2018 | Carter | |
| 2018/0047259 A1 | 2/2018 | Carter | |
| 2018/0074580 A1 | 3/2018 | Hardee | |
| 2018/0081439 A1 | 3/2018 | Daniels | |
| 2018/0101234 A1 | 4/2018 | Carter | |
| 2018/0139557 A1 | 5/2018 | Ochiai | |
| 2018/0146306 A1 | 5/2018 | Benattar | |
| 2018/0151035 A1 | 5/2018 | Maalouf | |
| 2018/0166063 A1 | 6/2018 | Long | |
| 2018/0181203 A1 | 6/2018 | Subramanian | |
| 2018/0182372 A1 | 6/2018 | Tester | |
| 2018/0190007 A1 | 7/2018 | Panteleev | |
| 2018/0246576 A1 | 8/2018 | Long | |
| 2018/0253627 A1 | 9/2018 | Baradel | |
| 2018/0267156 A1 | 9/2018 | Carter | |
| 2018/0271494 A1 | 9/2018 | Cuscuna | |
| 2018/0304310 A1 | 10/2018 | Long | |
| 2018/0309515 A1 | 10/2018 | Murakowski | |
| 2018/0310111 A1 | 10/2018 | Kappus | |
| 2018/0350339 A1 | 12/2018 | Macours | |
| 2018/0361174 A1 | 12/2018 | Radulescu | |
| 2019/0001129 A1 | 1/2019 | Rosenbluth | |
| 2019/0038496 A1 | 2/2019 | Levesque | |
| 2019/0091565 A1 | 3/2019 | Nelson | |
| 2019/0163275 A1 | 5/2019 | Iodice | |
| 2019/0175077 A1 | 6/2019 | Zhang | |
| 2019/0187244 A1 | 6/2019 | Riccardi | |
| 2019/0196578 A1 | 6/2019 | Iodice | |
| 2019/0196591 A1 | 6/2019 | Long | |
| 2019/0197840 A1 | 6/2019 | Kappus | |
| 2019/0197841 A1 | 6/2019 | Carter | |
| 2019/0197842 A1 | 6/2019 | Long | |
| 2019/0204925 A1 | 7/2019 | Long | |
| 2019/0206202 A1 | 7/2019 | Carter | |
| 2019/0235628 A1 | 8/2019 | Lacroix | |
| 2019/0257932 A1 | 8/2019 | Carter | |
| 2019/0310710 A1 | 10/2019 | Deeley | |
| 2019/0342654 A1 | 11/2019 | Buckland | |
| 2020/0042091 A1 | 2/2020 | Long | |
| 2020/0080776 A1 | 3/2020 | Kappus | |
| 2020/0082221 A1 | 3/2020 | Tsai | |
| 2020/0082804 A1 | 3/2020 | Kappus | |
| 2020/0103974 A1 | 4/2020 | Carter | |
| 2020/0117229 A1 | 4/2020 | Long | |
| 2020/0193269 A1 | 6/2020 | Park | |
| 2020/0218354 A1 | 7/2020 | Beattie | |
| 2020/0257371 A1 | 8/2020 | Sung | |
| 2020/0294299 A1 | 9/2020 | Rigiroli | |
| 2020/0302760 A1 | 9/2020 | Carter | |
| 2020/0320347 A1 | 10/2020 | Nikolenko | |
| 2020/0327418 A1 | 10/2020 | Lyons | |
| 2020/0380832 A1 | 12/2020 | Carter | |
| 2021/0037332 A1 | 2/2021 | Kappus | |
| 2021/0043070 A1 | 2/2021 | Carter | |
| 2021/0056693 A1 | 2/2021 | Cheng | |
| 2021/0109712 A1 | 4/2021 | Oliver | |
| 2021/0111731 A1 | 4/2021 | Oliver | |
| 2021/0112353 A1 | 4/2021 | Brian | |
| 2021/0141458 A1 | 5/2021 | Sarafianou | |
| 2021/0165491 A1 | 6/2021 | Sun | |
| 2021/0170447 A1 | 6/2021 | Buckland | |
| 2021/0183215 A1 | 6/2021 | Carter | |
| 2021/0201884 A1 | 7/2021 | Kappus | |
| 2021/0225355 A1 | 7/2021 | Long | |
| 2021/0275141 A1 | 9/2021 | Eckersley | |
| 2021/0303072 A1 | 9/2021 | Carter | |
| 2021/0303758 A1 | 9/2021 | Long | |
| 2021/0334706 A1 | 10/2021 | Yamaguchi | |
| 2021/0381765 A1 | 12/2021 | Kappus | |
| 2021/0397261 A1 | 12/2021 | Kappus | |
| 2022/0000447 A1 | 1/2022 | Eibl | |
| 2022/0035479 A1 | 2/2022 | Lasater | |
| 2022/0083142 A1 | 3/2022 | Brown | |
| 2022/0095068 A1 | 3/2022 | Kappus | |
| 2022/0113806 A1 | 4/2022 | Long | |
| 2022/0155949 A1 | 5/2022 | Ring | |
| 2022/0198892 A1 | 6/2022 | Carter | |
| 2022/0236806 A1 | 7/2022 | Carter | |
| 2022/0252550 A1 | 8/2022 | Catsis | |
| 2022/0300028 A1 | 9/2022 | Long | |
| 2022/0300070 A1 | 9/2022 | Iodice | |
| 2022/0329250 A1 | 10/2022 | Long | |
| 2022/0393095 A1 | 12/2022 | Chilles | |
| 2023/0036123 A1 | 2/2023 | Long | |
| 2023/0075917 A1 | 3/2023 | Pittera | |
| 2023/0117919 A1 | 4/2023 | Iodice | |
| 2023/0124704 A1 | 4/2023 | Buckland | |
| 2023/0141896 A1 | 5/2023 | Liu | |
| 2023/0168228 A1 | 6/2023 | Kappus | |
| 2023/0215248 A1 | 7/2023 | Lowther | |
| 2023/0228857 A1 | 7/2023 | Carter | |
| 2023/0251720 A1 | 8/2023 | Wren | |
| 2023/0259213 A1 | 8/2023 | Long | |
| 2023/0298444 A1 | 9/2023 | Kappus | |
| 2023/0360504 A1 | 11/2023 | Kappus | |
| 2023/0368771 A1 | 11/2023 | Kappus | |
| 2023/0378966 A1 | 11/2023 | Long | |
| 2024/0056655 A1 | 2/2024 | Page | |
| 2024/0069640 A1 | 2/2024 | Long | |
| 2024/0095953 A1 | 3/2024 | Lyons | |
| 2024/0096183 A1 | 3/2024 | Carter | |
| 2024/0129655 A1 | 4/2024 | Chilles | |

FOREIGN PATENT DOCUMENTS

| | | |
|---|---|---|
| CN | 101986787 | 3/2011 |
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| CN | 107407969 A | 11/2017 |
| CN | 107534810 A | 1/2018 |
| EP | 0057594 A2 | 8/1982 |
| EP | 309003 | 3/1989 |
| EP | 0696670 A1 | 2/1996 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| EP | 3216231 B1 | 8/2019 |
| EP | 3916525 | 12/2021 |
| GB | 2464117 | 4/2010 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 A | 3/2012 |
| JP | 5477736 B2 | 4/2014 |
| JP | 2015035657 A | 2/2015 |
| JP | 2016035646 | 3/2016 |
| JP | 2017168086 | 9/2017 |
| JP | 6239796 | 11/2017 |
| KR | 20120065779 | 6/2012 |
| KR | 20130055972 | 5/2013 |
| KR | 1020130055972 | 5/2013 |
| KR | 20160008280 | 1/2016 |
| KR | 20200082449 A | 7/2020 |
| TW | 201308837 | 2/2013 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |

(56) References Cited

FOREIGN PATENT DOCUMENTS

| WO | 2009071746 A1 | 6/2009 |
|---|---|---|
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 A1 | 11/2014 |
| WO | 2015006467 | 1/2015 |
| WO | 2015039622 | 3/2015 |
| WO | 2015127335 | 8/2015 |
| WO | 2015194510 | 12/2015 |
| WO | 2016007920 | 1/2016 |
| WO | 2016073936 | 5/2016 |
| WO | 2016095033 A1 | 6/2016 |
| WO | 2016099279 | 6/2016 |
| WO | 2016132141 | 8/2016 |
| WO | 2016132144 | 8/2016 |
| WO | 2016137675 | 9/2016 |
| WO | 2016162058 | 10/2016 |
| WO | 2016171651 | 10/2016 |
| WO | 2017172006 | 10/2017 |
| WO | 2018109466 A1 | 6/2018 |
| WO | 2018168562 A1 | 9/2018 |
| WO | 2019190894 | 10/2019 |
| WO | 2020049321 A2 | 3/2020 |
| WO | 2021130505 A1 | 7/2021 |
| WO | 2021260373 A1 | 12/2021 |
| WO | 2021262343 | 12/2021 |

OTHER PUBLICATIONS

Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for US App. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).

Notice of Allowance in U.S. Appl. No. 15/210,661 dated Jun. 17, 2020 (22 pages).
Nuttall, A. (Feb. 1981). Some windows with very good sidelobe behavior. IEEE Transactions on Acoustics, Speech, and Signal Processing. 8 pages.
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action (Ex Parte Quayle Action) dated Jan. 6, 2023 for U.S. Appl. No. 17/195,795 (pp. 1-6).
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Mar. 21, 2023 for U.S. Appl. No. 16/995,819 (pp. 1-7).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 1, 2023 for U.S. Appl. No. 16/564,016 (pp. 1-10).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Mar. 22, 2023 for U.S. Appl. No. 17/354,636 (pp. 1-5).
Office Action (Non-Final Rejection) dated Apr. 1, 2022 for U.S. Appl. No. 16/229,091 (pp. 1-10).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 2, 2022 for U.S. Appl. No. 17/068,831 (pp. 1-10).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Non-Final Rejection) dated May 25, 2022 for U.S. Appl. No. 16/843,281 (pp. 1-28).
ISR and WO for PCT/GB2020/052829 (Feb. 10, 2021) (15 pages).
ISR and WO for PCT/GB2021/052415 (Dec. 22, 2021) (16 pages).
ISR and WO for PCT/GB2023/050001 (May 24, 2023) (20 pages).
ISR for PCT/GB2020/052546 (Feb. 23, 2021) (14 pages).
ISR for PCT/GB2020/053373 (Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al, "Two-dimensional Scanning Tactile Display using Ultrasound Radiation Pressure", Haptic Interfaces for Virtual Environment and Teleoperator Systems, 2006 14th Symposium on

(56) References Cited

OTHER PUBLICATIONS

Alexandria, VA, USA Mar. 25-26, 2006, Piscataway, NJ, USA, IEEE, (Mar. 25, 2006), ISBN 978-1-4244-0226-7, pp. 57-61.

Jager et al., "Air-Coupled 40-KHZ Ultrasonic 2D-Phased Array Based on a 3D-Printed Waveguide Structure", 2017 IEEE, 4 pages.

Japanese Office Action (with English language translation) for Application No. 2017-514569, dated Mar. 31, 2019, 10 pages.

JonasChatel-Goldman, Touch increases autonomic coupling between romantic partners, Frontiers in Behavioral Neuroscience Mar. 2014, vol. 8, Article 95.

Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.

Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.

Jonathan Tompson et al., Real-Time Continuous Pose Recovery of Human Hands Using Convolutional Networks, ACM Trans. Graph. 33, 5, Article 169, Aug. 2014, pp. 1-10.

JP Office Action for JP 2020-534355 (Dec. 6, 2022) (8 pages).

K. Jia, Dynamic properties of micro-particles in ultrasonic transportation using phase-controlled standing waves, J. Applied Physics 116, n. 16 (2014) (12 pages).

Kai Tsumoto, Presentation of Tactile Pleasantness Using Airborne Ultrasound, 2021 IEEE World Haptics Conference (WHC) Jul. 6-9, 2021. Montreal, Canada. 5 pages.

Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.

Kamakura, T. and Aoki, K. (2006) "A Highly Directional Audio System using a Parametric Array in Air" WESPAC IX 2006 (8 pages).

Keisuke Hasegawa, Electronically steerable ultrasound-driven long narrow air stream, Applied Physics Letters 111, 064104 (2017) 5 pages.

Keisuke Hasegawa, Midair Ultrasound Fragrance Rendering, IEEE Transactions on Visualization and Computer Graphics, vol. 24, No. 4, Apr. 2018 1477. 9 pages.

Keisuke Hasegawa,,Curved acceleration path of ultrasound-driven air flow, J. Appl. Phys. 125, 054902 (2019); 6 pages.

Ken Wada, Ring Buffer Basics (2013) 6 pages.

Kolb, et al., "Time-of-Flight Cameras in Computer Graphics," Computer Graphics forum, vol. 29 (2010), No. 1, pp. 141-159.

Konstantinos Bousmalis et al., Domain Separation Networks, 29th Conference on Neural Information Processing Systems (NIPS 2016), Barcelona, Spain. Aug. 22, 2016, pp. 1-15.

Krim, et al., "Two Decades of Array Signal Processing Research—The Parametric Approach", IEEE Signal Processing Magazine, Jul. 1996, pp. 67-94.

Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.

Large et al.,Feel the noise: Mid-air ultrasound haptics as a novel human-vehicle interaction paradigm, Applied Ergonomics (2019) (10 pages).

Li, Larry, "Time-of-Flight Camera—An Introduction," Texas Instruments, Technical White Paper, SLOA190B—Jan. 2014 Revised May 2014, 10 pages.

Light, E.D., Progress in Two Dimensional Arrays for Real Time Volumetric Imaging, 1998 (17 pages).

Line S Loken, Coding of pleasant touch by unmyelinated afferents in humans, Nature Neuroscience vol. 12 [ No. 5 [ May 2009 547. 2 pages.

M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.

M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).

Mahboob, "Artificial neural networks for learning inverse kinematics of humanoid robot arms." MS Thesis, 2015. (Year: 2015) 95 pages.

Mahdi Rad et al., Feature Mapping for Learning Fast and Accurate 3D Pose Inference from Synthetic Images, Mar. 26, 2018, pp. 1-14.

Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.

Mariana von Mohr, The soothing function of touch: affective touch reduces feelings of social exclusion, Scientific Reports, 7: 13516, Oct. 18, 2017.

Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.

Markus Oberweger et al., DeepPrior++: Improving Fast and Accurate 3D Hand Pose Estimation, Aug. 28, 2017, pp. 1-10.

Markus Oberweger et al., Hands Deep in Deep Learning for Hand Pose Estimation, Dec. 2, 2016, pp. 1-10.

Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).

Marzo et al., Holographic acoustic elements for manipulation of levitated objects, Nature Communications DOI: 10.1038/ncomms9661 (2015) (7 pages).

Meijster, A., et al., "A General Algorithm for Computing Distance Transforms in Linear Time," Mathematical Morphology and its Applications to Image and Signal Processing, 2002, pp. 331-340.

Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.

Mitsuru Nakajima, Remotely Displaying Cooling Sensation via Ultrasound-Driven Air Flow, Haptics Symposium 2018, San Francisco, USA p. 340.

Mohamed Yacine Tsalamlal, Affective Communication through Air Jet Stimulation: Evidence from Event-Related Potentials, International Journal of Human—Computer Interaction 2018. 13 pages.

Mohamed Yacine Tsalamlal, Non-Intrusive Haptic Interfaces: State-of-the Art Survey, HAID 2013, LNCS 7989, pp. 1-9, 2013.

Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).

Mueller, GANerated Hands for Real-Time 3D Hand Tracking from Monocular RGB, Eye in-Painting with Exemplar Generative Adverserial Networks, pp. 49-59 (Jun. 1, 2018).

Nina Gaissert, Christian Wallraven, and Heinrich H. Bulthoff, "Visual and Haptic Perceptual Spaces Show High Similarity in Humans ", published to Journal of Vision in 2010, available at http://www.journalofvision.org/content/10/11/2 and retrieved on Apr. 22, 2020 ( Year: 2010), 20 pages.

Rocchesso et al., Accessing and Selecting Menu Items by In-Air Touch, ACM CHItaly'19, Sep. 23-25, 2019, Padova, Italy (9 pages).

Rochelle Ackerley, Human C-Tactile Afferents Are Tuned to the Temperature of a Skin-Stroking Caress, J. Neurosci., Feb. 19, 2014, 34(8):2879-2883.

Ryoko Takahashi, Tactile Stimulation by Repetitive Lateral Movement of Midair Ultrasound Focus, Journal of Latex Class Files, vol. 14, No. 8, Aug. 2015.

Schmidt, Ralph, "Multiple Emitter Location and Signal Parameter Estimation" IEEE Transactions of Antenna and Propagation, vol. AP-34, No. 3, Mar. 1986, pp. 276-280.

Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.

(56) References Cited

OTHER PUBLICATIONS

Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https://doi.org/10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv: 1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Steve Guest et al., "Audiotactile interactions in roughness perception", Exp. Brain Res (2002) 146:161-171, DOI 10.1007/s00221-002-1164-z, /Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).

Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn.' In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Feb. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd

(56) References Cited

OTHER PUBLICATIONS

International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 7, 2023 for U.S. Appl. No. 16/144,474 (pp. 1-16).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pp. 1-6).
Office Action dated Apr. 28, 2020 for U.S. Appl. No. 15/396,851 (pp. 1-12).
"Flexible piezoelectric transducer for ultrasonic inspection of non-planar components." Ultrasonics 48.5 (2008): 367-375.
"Welcome to Project Soli" video, https://atap.google.com/#project-soli Accessed Nov. 30, 2018, 2 pages.
A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Aksel Sveier et al.,Pose Estimation with Dual Quaternions and Iterative Closest Point, 2018 Annual American Control Conference (ACC) (8 pages).
Al-Mashhadany, "Inverse Kinematics Problem (IKP) of 6-DOF Manipulator by Locally Recurrent Neural Networks (LRNNs)," Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).
Almusawi et al., "A new artificial neural network approach in solving inverse kinematics of robotic arm (denso vp6242)." Computational intelligence and neuroscience 2016 (2016). (Year: 2016) 11 pages.
Amanda Zimmerman, The gentle touch receptors of mammalian skin, Science, Nov. 21, 2014, vol. 346 Issue 6212, p. 950.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.

(56) References Cited

OTHER PUBLICATIONS

Azad et al., Deep domain adaptation under deep label scarcity. arXiv preprint arXiv:1809.08097 (2018) (Year: 2018) 10 pages.
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al.,"A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Cappellari et al., "Identifying Electromyography Sensor Placement using Dense Neural Networks." In DATA, pp. 130-141. 2018. (Year: 2018).
Casper et al., Realtime Control of Multiple-focus Phased Array Heating Patterns Based on Noninvasive Ultrasound Thermography, IEEE Trans Biomed Eng. Jan. 2012; 59(1):95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. ieee transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.

David Joseph Tan et al., Fits like a Glove: Rapid and Reliable Hand Shape Personalization, 2016 IEEE Conference on Computer Vision and Pattern Recognition, pp. 5610-5619.
Definition of "Interferometry" according to Wikipedia, 25 pages, Retrieved Nov. 2018.
Definition of "Muitilateration" according to Wikipedia, 7 pages., Retrieved Nov. 2018.
Definition of "Trilateration" according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
DeSilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report Dated Sep. 22, 2021, 15 pages.
EPO Communication for Application 18 811 906.9 (Nov. 29, 2021) (15 pages).
EPO Examination Report 17 748 4656.4 (Jan. 12, 2021) (16 pages).
EPO Examination Search Report 17 702 910.5 (Jun. 23, 2021) 10 pages.
EPO ISR and WO for PCT/GB2022/050204 (Apr. 7, 2022) (15 pages).
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.

(56) References Cited

OTHER PUBLICATIONS

Guez, "Solution to the inverse kinematic problem in robotics by neural networks." In Proceedings of the 2nd International Conference on Neural Networks, 1988. San Diego, California. (Year: 1988) 8 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technologyOct. 2009 pp. 139-148.
Hoshi et al.,Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=GB (Accessed May 29, 2022).
Hua J, Qin H., Haptics-based dynamic implicit solid modeling, IEEE Trans Vis Comput Graph. Sep.-Oct. 2004;10 (5):574-86.
Hyunjae Gil, Whiskers: Exploring the Use of Ultrasonic Haptic Cues on the Face, CHI 2018, Apr. 21-26, 2018, Montréal, QC, Canada, 13 pages.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitation to Pay Additional Fees for PCT/GB2022/051821 (Oct. 20, 2022), 15 pages.
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).

(56) References Cited

OTHER PUBLICATIONS

Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK; 25 pages.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Partial ISR for PCT/GB2023/050001 (Mar. 31, 2023) 13 pages.
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
PCT Partial International Search Report for Application No. PCT/GB2018/053404 date of mailing Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Prabhu, K. M. (2013). Window Functions and Their Applications in Signal Processing . CRC Press., pp. 87-127.
Rakkolainen et al., A Survey of Mid-Air Ultrasound Haptics and Its Applications (IEEE Transactions on Haptics), vol. 14, No. 1, 2021, 18 pages.
Andre J. Duerinckx, Matched gaussian apodization of pulsed acoustic phased arrays, Ultrasonic Imaging, vol. 2, Issue 4, Oct. 1980, pp. 338-369.
EPO Examination Report for EP19769198.3 (Jul. 11, 2023) 9 pages.
Examination Report for EP 17 826 539.3 (Aug. 2, 2023) (5 pages).
First Examination report for ndian Patent Application No. 202247024128 (Aug. 11, 2023) (6 pages).
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/052122 (Oct. 18, 2023) 13 pages.
ISR and WO for PCT/GB2023/052612 (Mar. 7, 2024) 18 pages.
Ochiai, Cross-Field Aerial Haptics: Rendering Haptic Feedback in Air with Light and Acoustic Fields, CHI (Year: 2016) 10 pages.
Office Action (Non-Final Rejection) dated Jan. 19, 2024 for U.S. Appl. No. 18/305,354 (pp. 1-4).
Office Action (Non-Final Rejection) dated Feb. 1, 2024 for U.S. Appl. No. 17/835,411 (pp. 1-7).
Office Action (Non-Final Rejection) dated Mar. 14, 2024 for U.S. Appl. No. 18/188,584 (pp. 1-5).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Notice of Allowance and Fees Due (PTOL-85)) dated Jan. 31, 2024 for U.S. Appl. No. 18/352,981 (pp. 1-6).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Schiefler, Generation and Analysis of Ultrasound Images Using Plane Wave and Sparse Arrays Techniques, Sensors (Year: 2018) 23 pages.

\* cited by examiner

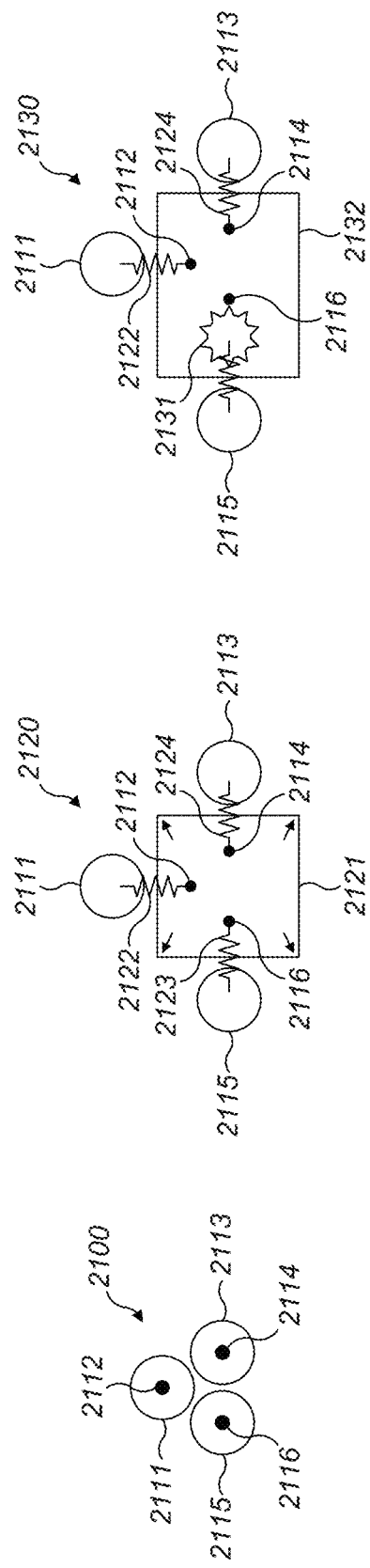
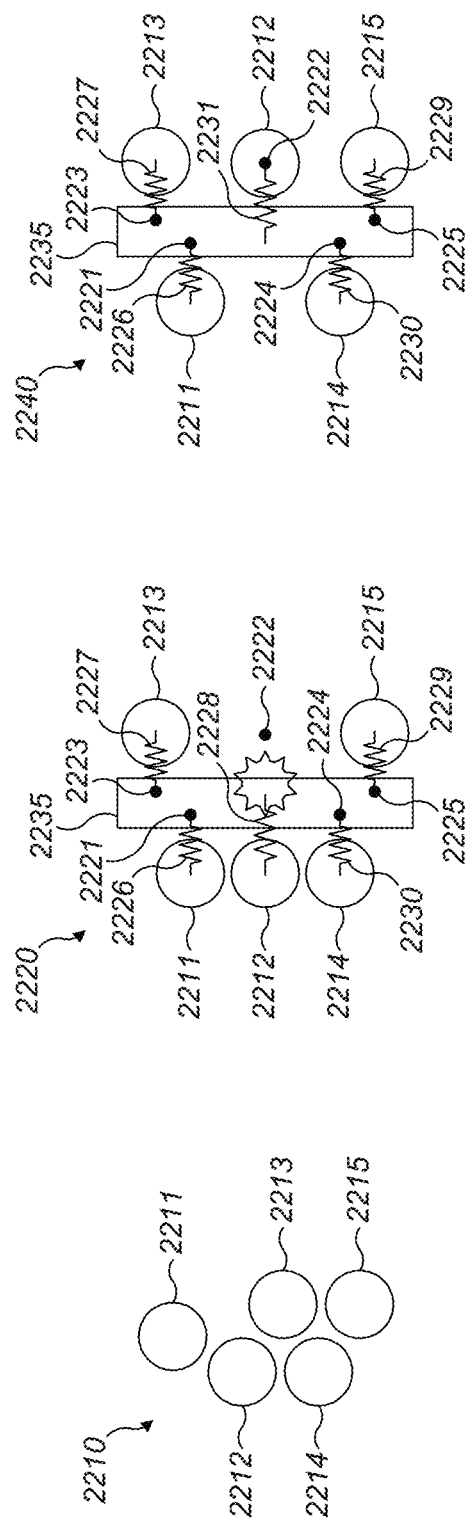
FIG. 21
FIG. 22

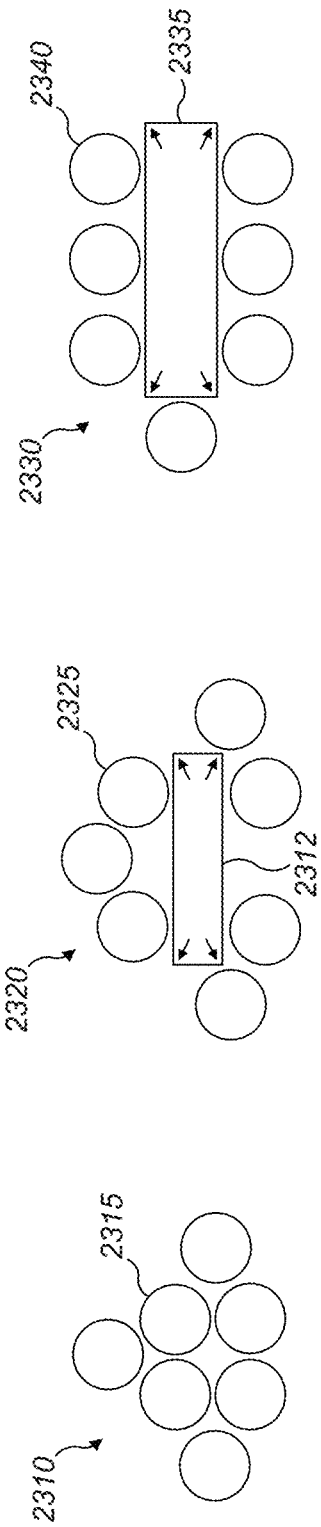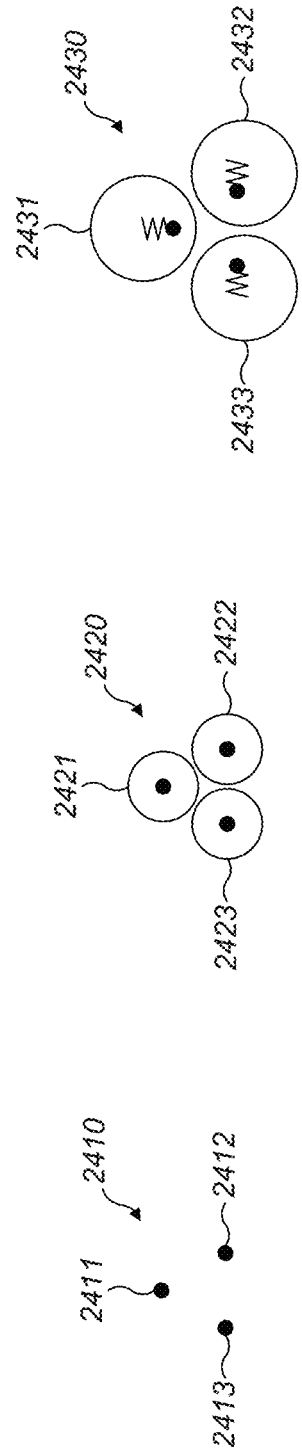
FIG. 23
FIG. 24

CALIBRATION TECHNIQUES IN HAPTIC SYSTEMS

RELATED APPLICATION

This application claims the benefit of the following three U.S. Provisional Patent Applications, all of which are incorporated by reference in their entirety:
1. Ser. No. 62/193,180, filed on Jul. 16, 2015.
2. Ser. No. 62/275,206, filed on Jan. 5, 2016.
3. Ser. No. 62/275,030, filed on Jan. 5, 2016.

FIELD OF THE DISCLOSURE

The present disclosure relates generally to improved calibration techniques for haptic-based systems.

BACKGROUND

A continuous distribution of sound energy, referred to as an "acoustic field", may be used for a range of applications including haptic feedback in mid-air.

By defining one or more control points in space, the acoustic field can be controlled. Each point can be assigned a value equating to a desired amplitude at the control point. A physical two-dimensional array of transducers can then be controlled to create an acoustic field exhibiting the desired amplitude at the control points.

However, because complete control of space is not possible, controlling the acoustic field at given points yields erroneous local maxima in the acoustic field levels at other related positions. In relation to mid-air haptic feedback, these can interfere in interactions with the space by creating secondary effects and ghost phenomena that can be felt outside the interaction area. The level and nature of the secondary maxima in the acoustic field is determined by how the space is controlled. One of the ways to change how the space is controlled is by rearranging the transducer elements. By arranging the two-dimensional array of transducer elements in different ways, unwanted effects on the acoustic field can be limited and controlled.

How to best approach designing an array of transducers that generates control points in an acoustic field with the minimum of erroneous maxima is not trivial.

Further, in prior applications, transducer layouts that minimize the formation of these erroneous maxima were described. In reality, however, due to physical manufacturing and production constraints inherent in the process of electronic design and layout these ideal configurations are often not achievable. As a result, a method to create configurations that maintain the required beneficial properties of the ideal physical arrangement while accounting for such design limitations is needed. Although this process could be performed manually this would be time consuming and prone to human error and as such an automated approach would be preferable.

Finally, in order to create an appropriate acoustic field that responds to input, a sensor must be attached to the system. This sensor is required for interaction, but the correspondence between the coordinate space of the acoustic field and the coordinate space of the sensor, must be established first. A human can perform this initial calibration step, by actuating the device, prompting for a corresponding behavior and then measuring the output of the sensor in this situation. This provides the correspondence between the two vector spaces. However, this requires human interaction and so is subject to human error, as well as requiring human intervention in a more general sense.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 21-26 show various embodiments of physical simulation systems configured to yield metaphors for constraints in transducer layout in haptic systems.

Figure 1:
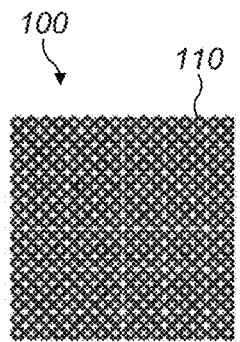
FIG. 1 shows transducers arranged in a rectilinear array.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Described herein are certain techniques to enhance calibration techniques in haptic systems. Some or all of these techniques may be used at the same time or one after the other in order to improve such calibration.

I. ARRAY CONFIGURATIONS TO REDUCE SECONDARY MAXIMA

An acoustic field may be controlled by defining one or more control points in space. Each control point can be assigned a value equating to a desired amplitude at that control point. A physical set of transducers may then be controlled to create an acoustic field exhibiting the desired amplitude at the control points.

Because complete control of space is not possible, controlling the acoustic field at given points may yield erroneous local maxima in the acoustic field levels at other related positions. In relation to mid-air haptic feedback, these can interfere in interactions with the space by creating secondary effects and ghost phenomena that can be felt outside the interaction area.

The level and nature of the secondary maxima in the acoustic field is determined by how the space is controlled. One of the ways to change how the space is controlled is by rearranging the transducer elements. By arranging the transducer elements in different ways, unwanted effects on the acoustic field can be limited and controlled.

How to best approach designing an array of transducers that generates control points in an acoustic field with the minimum of erroneous maxima is not trivial. Existing array geometries will be reviewed to consider their drawbacks. New array geometries will then be reviewed to remedy these drawbacks.

1. Figure Definitions

FIGS. 2, 4, 6, 8, 10, 12, 14, 16, 17 and 18 are simulations of a star shape made of 30 control points. The star shape is created on a plane 15 cm above the center of each transducer array and has a diameter of 14 cm. Each pixel is 1 mm$^2$. Similar results may occur with other sets of control points, pixels and transducer arrays.

2. Existing Array Configurations

Figure 2:
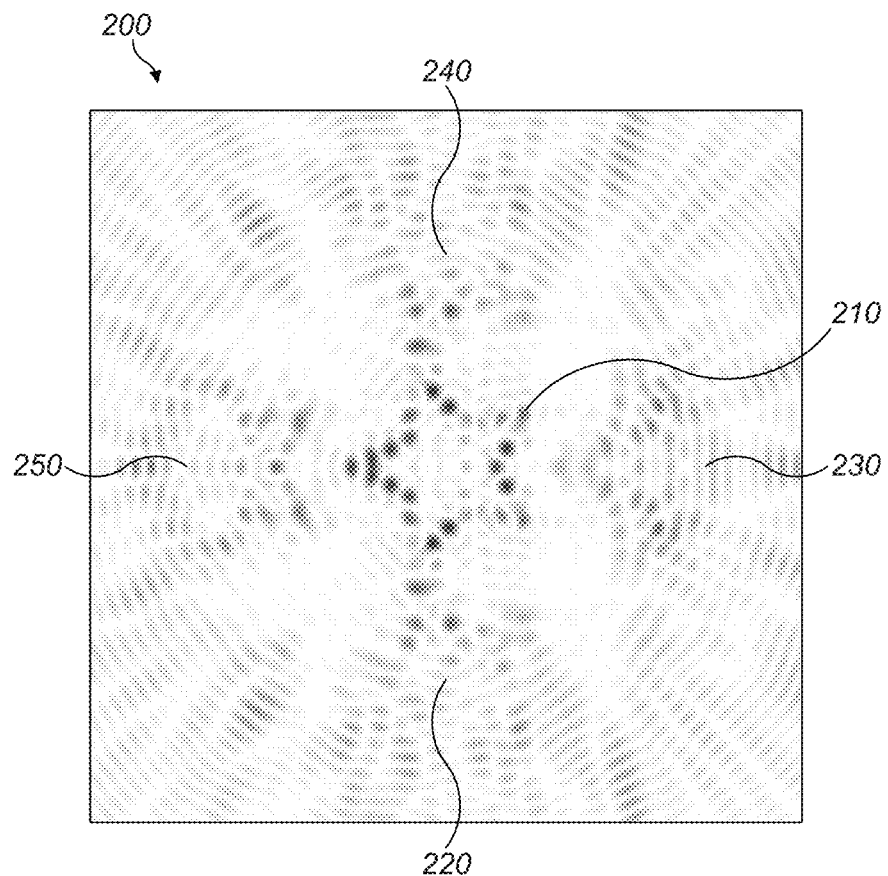
FIG. 2 shows the results of a rectilinear array simulation.

FIG. 1 shows the most obvious array 100 of 256 transducers to produce in order to control an acoustic field: the rectilinear array 110. This configuration is easy to model and to manufacture. As shown in FIG. 2, this rectilinear array simulation 200 suffers from Fourier transform-based ghost images 220, 230, 240, 250 reflecting the true image 210. This is due to the transducer arrangement being close to a truncated regular sampling of a plane surface.

Figure 3:
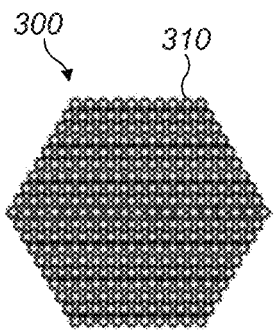
FIG. 3 shows transducers arranged in a hexagonal array.

Since the rectilinear structure is the source of these four ghost images 220 230 240 250, a potential solution is to break up the rectilinear structure. As shown in FIG. 3, a simple approach for an array 300 without rectilinear structure and better packing density of transducers may be obtained by being packed in a hexagon array 310.

Figure 4:
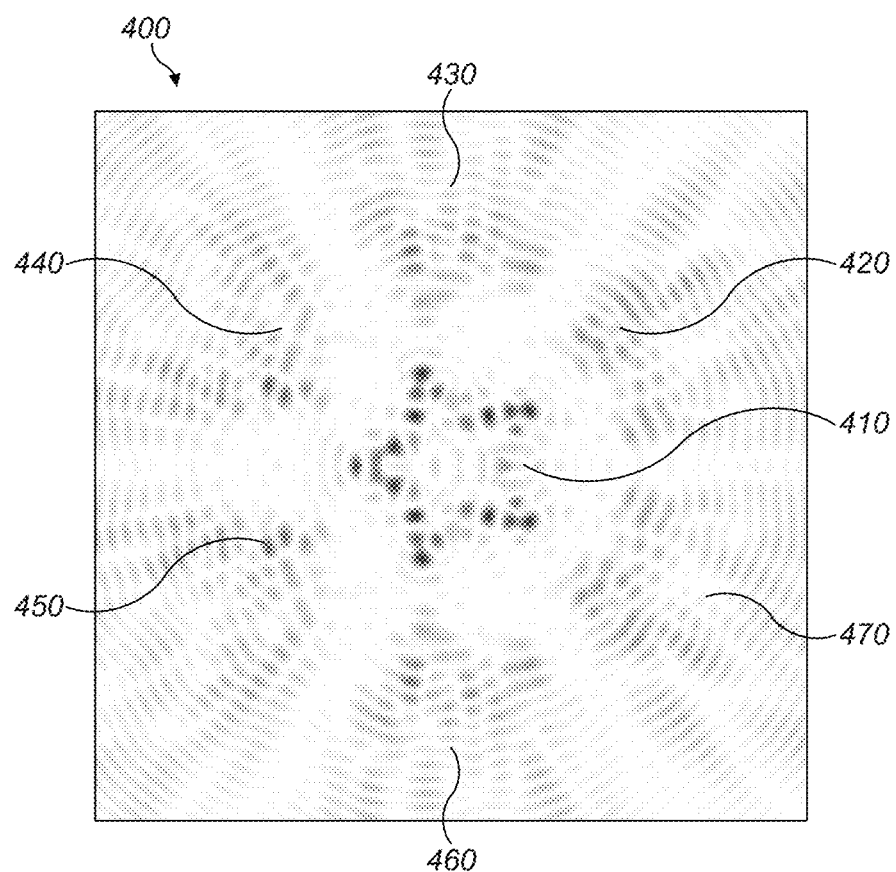
FIG. 4 shows the results of a hexagonal array simulation.

As shown by the hexagonal array simulation 400 in FIG. 4, the hexagon array 310 (here consisting of 271 transducers instead of 256) creates six ghost images 420, 430, 440, 450, 460, 470 around the intended pattern 410. These ghost images are visibly parts of translated copies of the pattern, in much the same fashion as was evident in the rectilinear matrix approach. Thus the repeated and uniform sampling of the plane along given—but not necessarily orthogonal—directions is to blame for this behavior.

Figure 5:
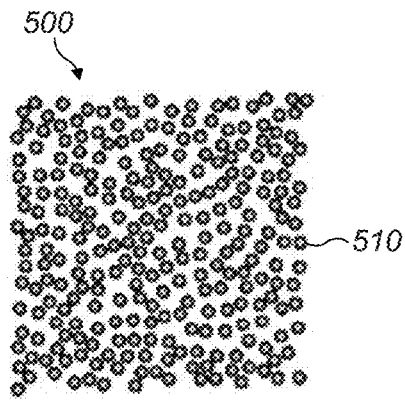
FIG. 5 shows transducers arranged in a random array.
Figure 6:
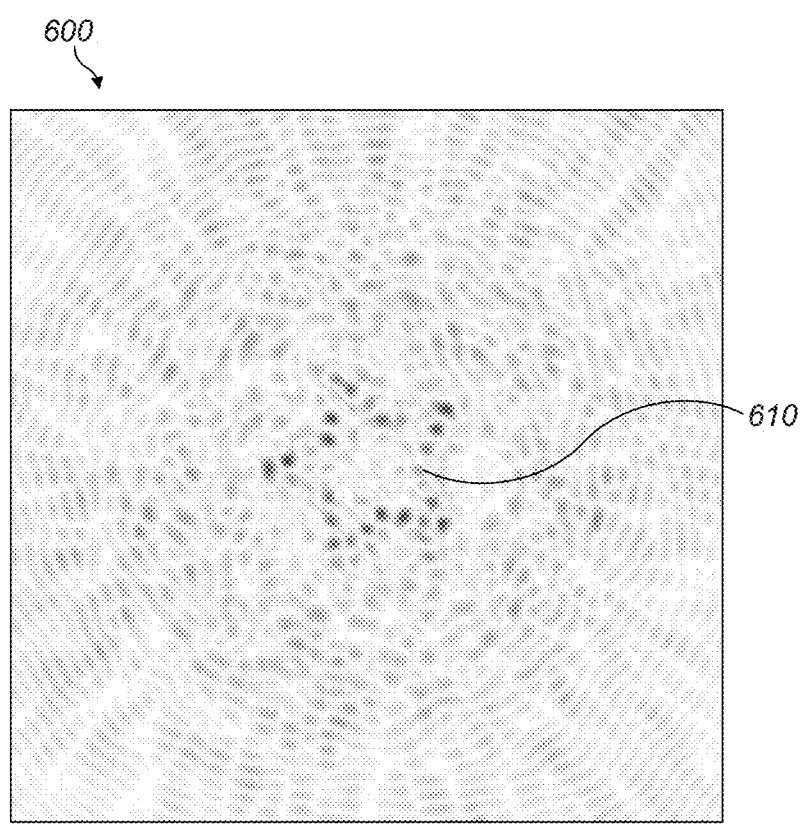
FIG. 6 shows the results of a random array simulation.

As shown in FIG. 5, to prevent these ghost images, it is possible to break up the uniform structure into an array 500 in which the transducer elements are positioned in a random configuration array 510. As shown in FIG. 6, the random array simulation 600 is effective in that there are no extra images beyond the intended image 610. Nevertheless, the packing of the transducer elements 510 is heavily compromised. This yields lower intensities at the control point foci as well as unpredictable variations in local transducer density. This results in fluctuations in acoustic field amplitudes and array efficiency for moving control points.

3. Phyllotactic Spiral Transducer Array

The issues outlined in the previous section necessitate the creation of a new type of array that has both uncorrelated secondary maxima that fall away from the control points and uniform density to avoid unexpected power fall off. A transducer arrangement that achieves both of these goals is desired with a geometry that has both uniform or predictable density and non-uniform sampling in any given direction to avoid ghost images.

The phyllotactic spiral pattern is common in nature where a dense packing of leaves to absorb the maximum amount of sunlight is needed. Its construction is based on angular proportions of the golden ratio (an irrational number) to produce alternating curved packing of elements that—while uniform and regular—can never result in a periodic sampling in any given direction. Two quantities are in the golden ratio (an irrational number, approximately 1.618) if their ratio is the same as the ratio of their sum to the larger of the two quantities.

Figure 7:
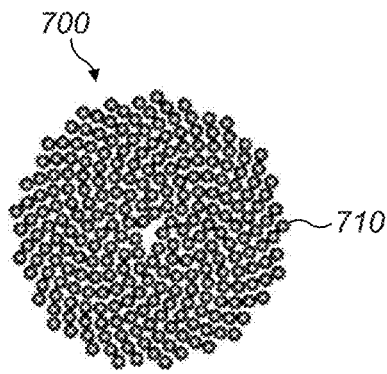
FIG. 7 shows transducers arranged in a phyllotactic spiral array.
Figure 8:
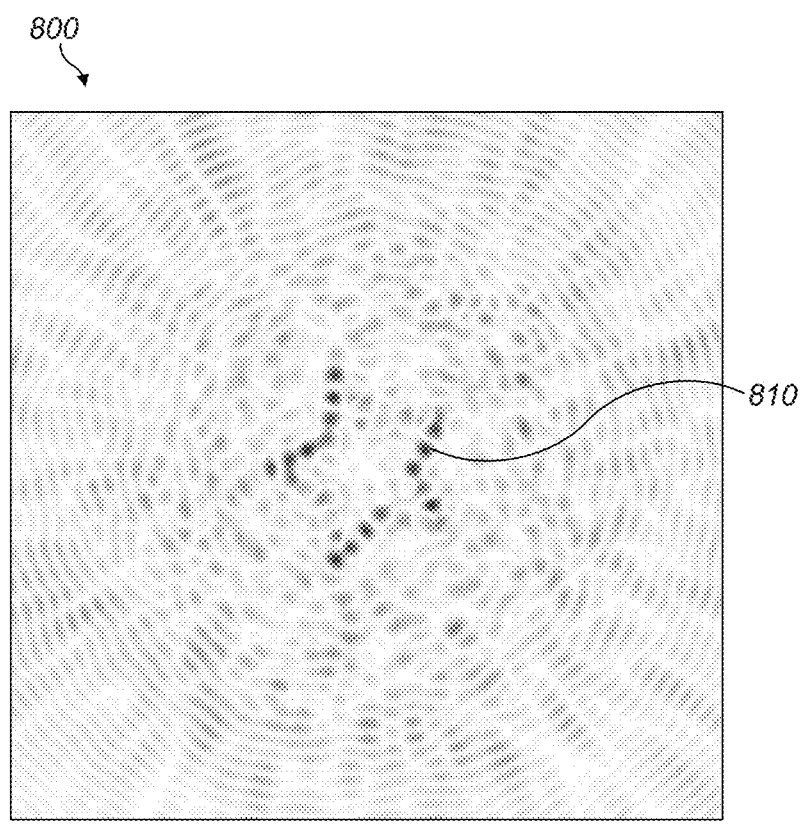
FIG. 8 shows the results of a phyllotactic spiral array simulation.

As shown in FIG. 7, an array 700 of transducer elements may arranged a variant of the phyllotactic spiral 710. As shown in FIG. 8, the phyllotactic spiral array simulation 800 removes ghost images beyond the intended image 810 and reduces secondary maxima by decorrelation.

Figure 9:
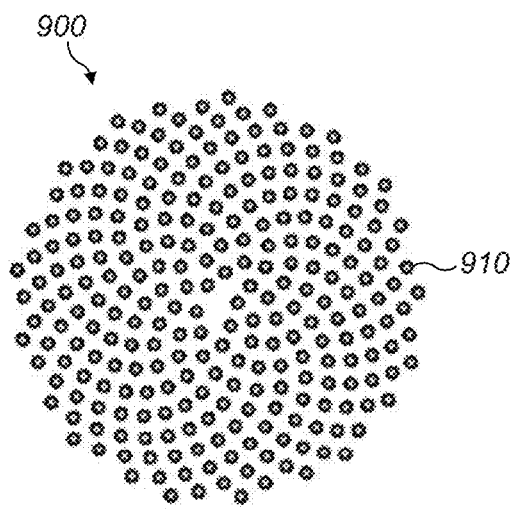
FIG. 9 shows transducers arranged in an expanded phyllotactic spiral array.
Figure 10:
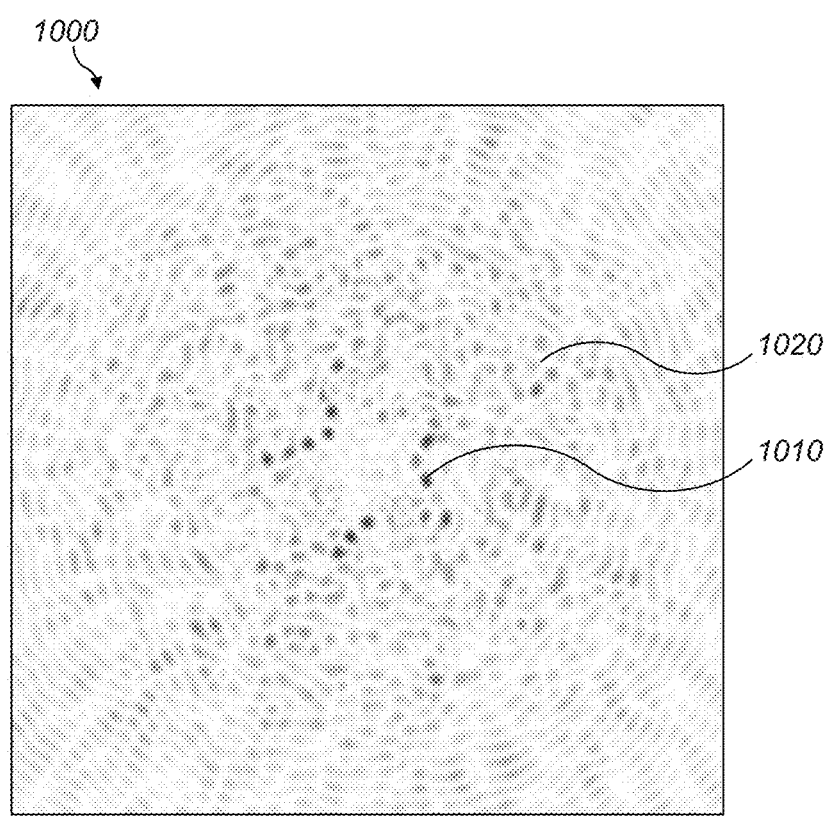
FIG. 10 shows the results of an expanded phyllotactic spiral array simulation.

As shown in FIG. 9, an array 900 of transducer elements may be arranged as an expanded phyllotactic spiral 910 with more coverage in space. As shown in FIG. 10, this expanded phyllotactic spiral array simulation 1000 results in an intended image 1010 with more de-correlated noise 1020 at an amplitude level close to the desired control point output.

The extra images in the regular array arrangements shown in FIGS. 2 and 4 are caused by collinear transducer elements that are repeated with a uniform separation. As a side effect, these elements in their collective action construct a discrete Fourier transform of the shape. This leads to the periodic boundary conditions where these collinear groupings terminate. The artifacts that manifest as a result of the periodic boundary conditions are the "ghost images" shown in those figures.

As shown, these images can be removed by creating a system wherein collinear groupings are minimized or there are no uniform separations. In these situations, the groupings do not have the same sampling approach as a discrete Fourier transform and so will not exhibit these effects. A random or Poisson disk sampling may be effective to eliminate these effects, but this has a downside of reducing the ability to pack the elements. Packing techniques that prevent uniform separation or collinearity are non-trivial as crystal structures in nature can attest. But the phyllotactic spiral design fulfills all these criteria by placing the transducer elements along curves that are constructed and governed by irrational numbers, minimizing the effects of collinearity.

Figure 11:
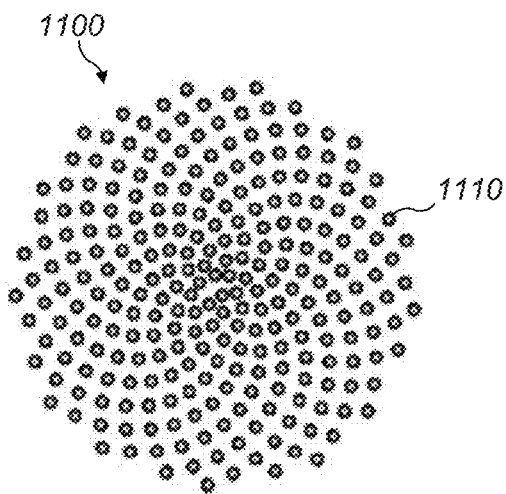
FIG. 11 shows transducers arranged in a golden ratio-based phyllotactic spiral array.
Figure 12:
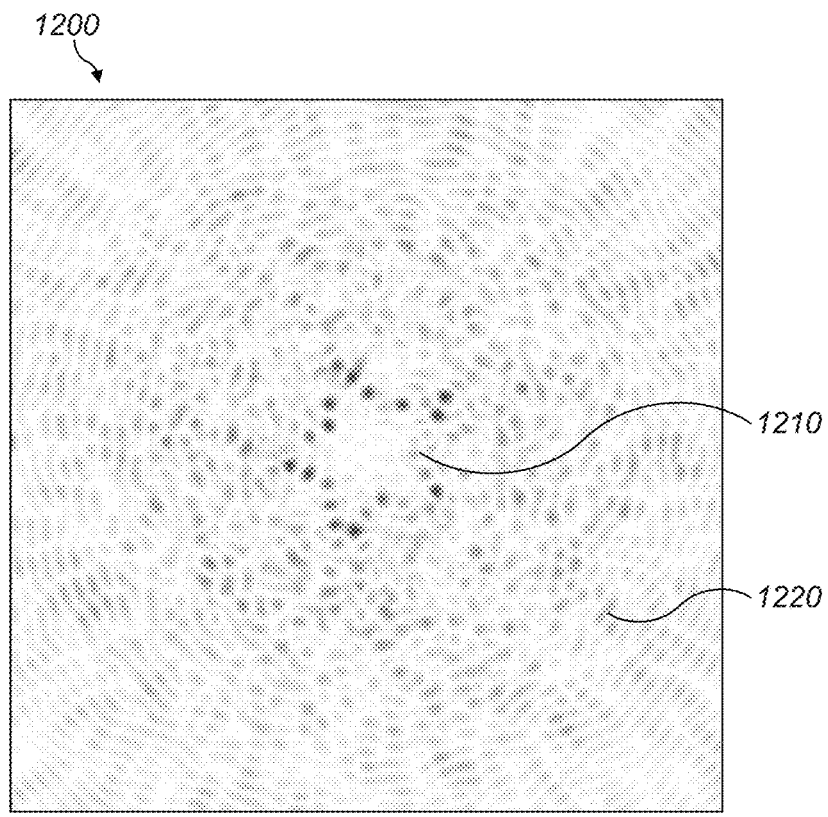
FIG. 12 shows the results of an expanded golden ratio-based spiral array simulation.

Instead of using a square root distance (raising by a power of 0.5) that distributes transducers equally in array area, the exponent may be increased (raising by a power of the golden ratio minus one, 0.618) to spread the transducers more towards the edges. As shown in FIG. 11, an array 1100 of transducer elements may be arranged as a golden ratio-based phyllotactic spiral 1110. As shown in FIG. 12, this golden ratio-based phyllotactic spiral array simulation 1200 results in an intended image 1210 with more de-correlated noise 1220 at an amplitude level close to the desired control point output. This suppresses noise more while controlling a larger area and degrades more gracefully towards the edge of the array.

By using the higher power in the exponent, the phyllotactic spiral relaxes the packing of the elements, making it more similar to the natural arrangement found in sunflowers. Here, the distribution of the transducers in a phyllotactic spiral pattern is sparser toward the edges of the phyllotactic spiral pattern. As the elements get further apart as they move away from the center, they may produce reduced haptic effects at the edge. However, these sparse transducers at the edge remain able to suppress excess noise, at the cost of a larger footprint and some extra transducers. This effect may justify the use of higher exponents in the production of the spiral.

The phyllotactic spiral array need not actually be in a complete spiral formation. The spiral may be cut into shapes that are more suitable for array footprints such as in a rectilinear, square or rectangle format. Thus one or more partial phyllotactic spiral patterns may be used to generate the desired effects. The use of the term "partial phyllotactic spiral pattern" herein may mean either a portion of a complete phyllotactic spiral pattern or a complete phyllotactic spiral pattern.

Figure 13:
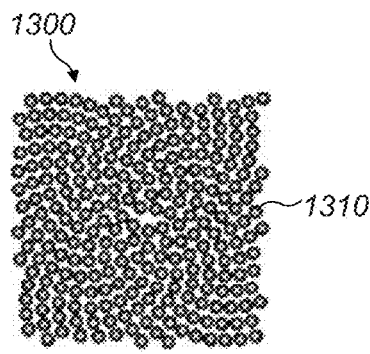
FIG. 13 shows transducers arranged in a phyllotactic spiral-based square format array.
Figure 14:
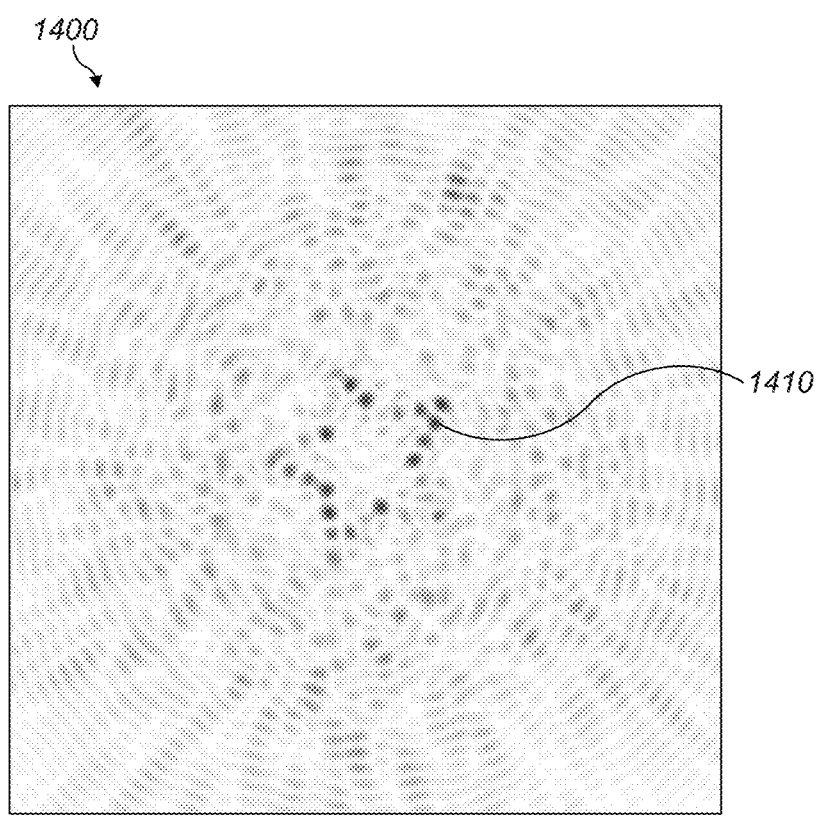
FIG. 14 shows the results of a phyllotactic spiral-based square format simulation.

As shown in FIG. 13, an array 1300 of transducer elements may be arranged as a phyllotactic spiral-based square format 1310. This array 1300 comprises transducer elements in multiple partial phyllotactic spiral patterns. As shown in FIG. 14, this phyllotactic spiral-based square format simulation 1400 results in an intended image 1410 with limited noise. A rectangular format may also be used.

Figure 15:
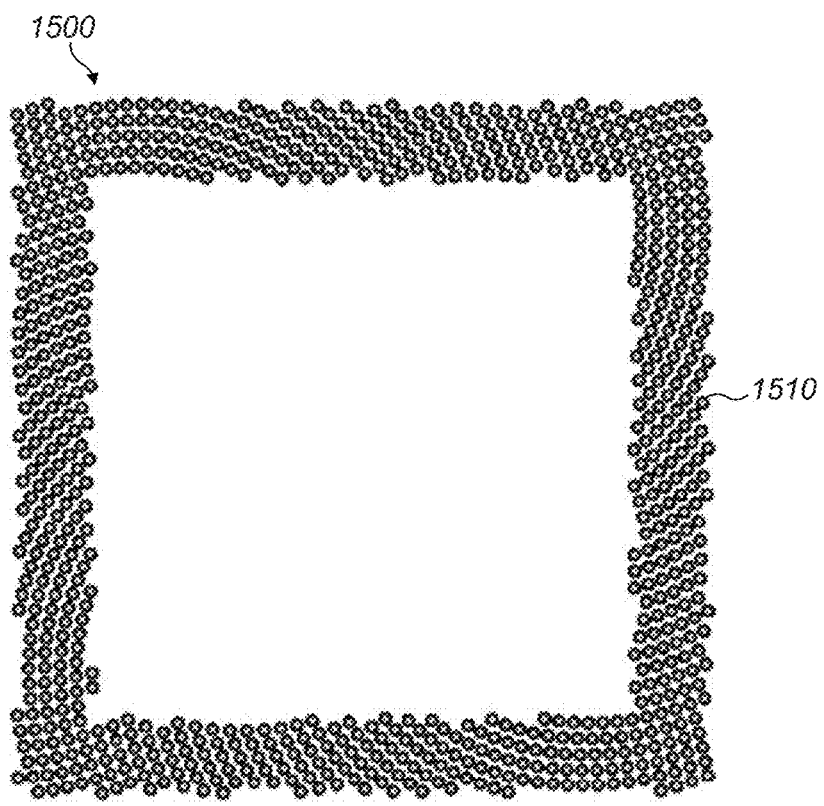
FIG. 15 shows transducers arranged in a phyllotactic spiral-based square frame array.
Figure 16:
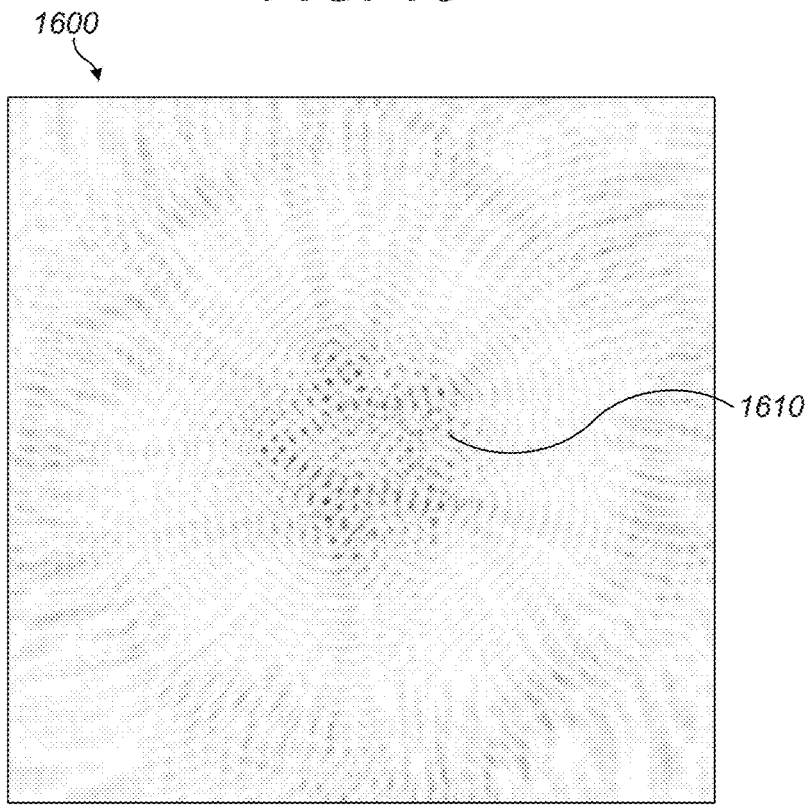
FIG. 16 shows the results of a phyllotactic spiral-based square frame array.
Figure 17:
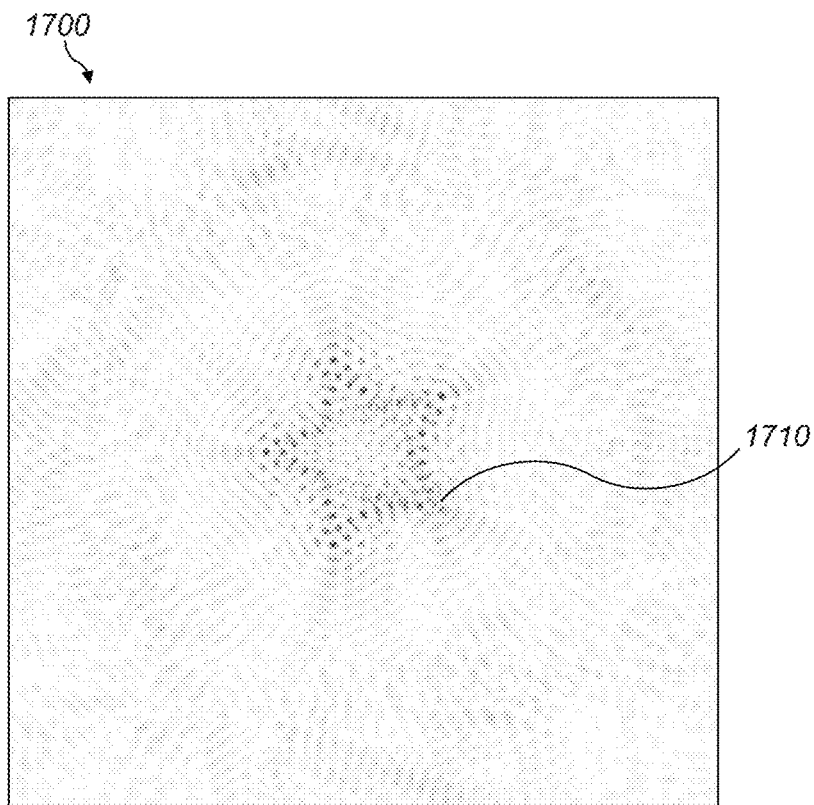
FIG. 17 shows the results of a phyllotactic spiral-based square frame array with the transducers rotated 45 degrees toward the center of the image.
Figure 18:
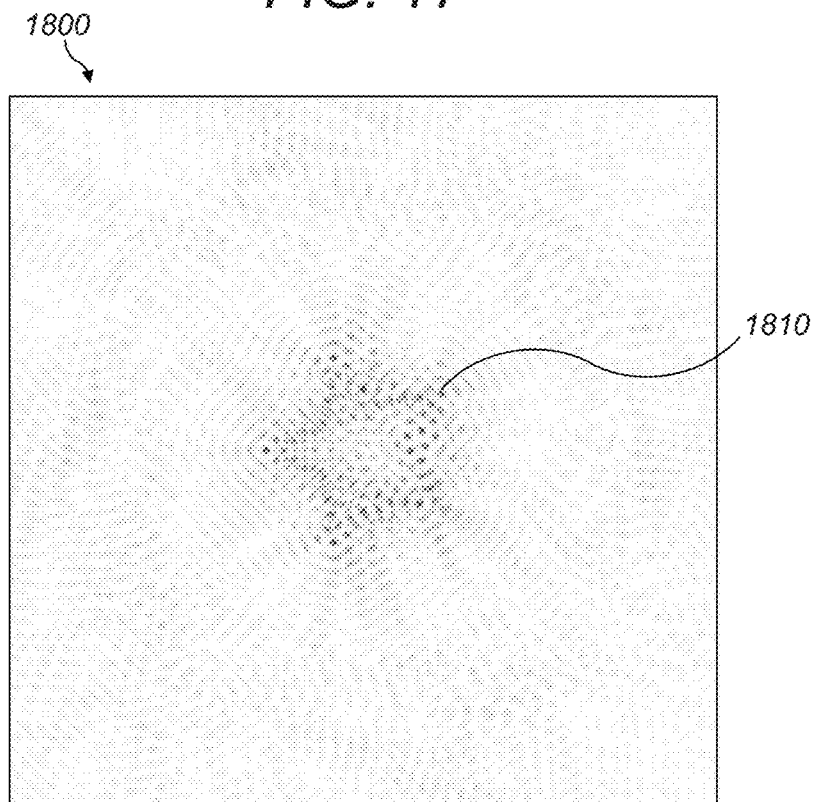
FIG. 18 shows the results of a phyllotactic spiral-based square frame array with the transducers pointing directly toward the center of the image.

Alternatively, the phyllotactic spiral may be cut into a frame for a device that gives mid-air haptic capabilities. As shown in FIG. 15, an array 1500 of transducer elements may be arranged as a phyllotactic spiral-based square frame format 1510. This array 1500 comprises transducer elements in multiple partial phyllotactic spiral patterns. This array 1500 used 800 transducers. As shown in FIG. 16, this phyllotactic spiral-based square frame simulation 1600 results in an intended image 1610 with low shape quality. This low shape quality can be attributed to a shallow angle of the control points that make up the shape.

Moving the transducers in the z-direction (the direction orthogonal to the two-dimensional transducer array) and rotating them 45 degrees into a beveled "picture frame" arrangement verifies this result. In the arrangement shown in FIG. 17, the simulation 1700 shows transducers are pointing at this 45-degree angle toward the center of the image. (Because the transducers are pointing in opposite directions on opposite sides of the image, the differential between transducers on opposite sides of the image is 90 degrees). Here the intended image 1710 is of very high quality with little noise. This pushes each transducer in the array closer to line of sight with the generated image, improving its ability to focus.

Counter-intuitively, rotating each transducer further to point directly at the center of the shape actually degrades focusing performance, as the lack of resolving power perpendicular to the four sides of the array creates more powerful secondary maxima in the plane of the shape. In the arrangement shown in FIG. 18, the simulation 1800 shows transducers are pointing directly toward the center of the image. Here the intended image 1810 includes significantly more noise.

The transducers need not all point in the same direction or be fixed at the same orientation in the z-axis.

While these transducer arrangements have been shown to use circular transducer elements the designs described are also applicable to differently shaped transducer elements, including square, rectangle or ellipse or other shapes.

4. Importance of Reduction and Decorrelation of Noise

Noise in the array output can cause a number of different phenomena. The first and most obvious side effect is that a high level of noise may interfere with the mid-air haptic qualities of the array. They may cause phantom points and low level stimulation that can drown out the intended signal. Another side effect is that since the array produces sound as a side effect, stronger random secondary maxima may result in more audible noise outside the working volume.

Reducing nearby secondary maxima will reduce the level of points of feedback that can interfere in the haptic sensation. De-correlating the noise with the feedback will smooth out noise more effectively by making it destructively interfere with itself spatially and temporally.

II. COMPUTATIONAL AUTOMATION OF TRANSDUCER PLACEMENT IN HAPTIC SYSTEMS

If the physical limitation of the placing of each electronic component is applied to the ideal layout by pruning transducers that are inappropriately placed, the design becomes sparse and inefficient.

1. Application of Physical Constraints

Figure 19:
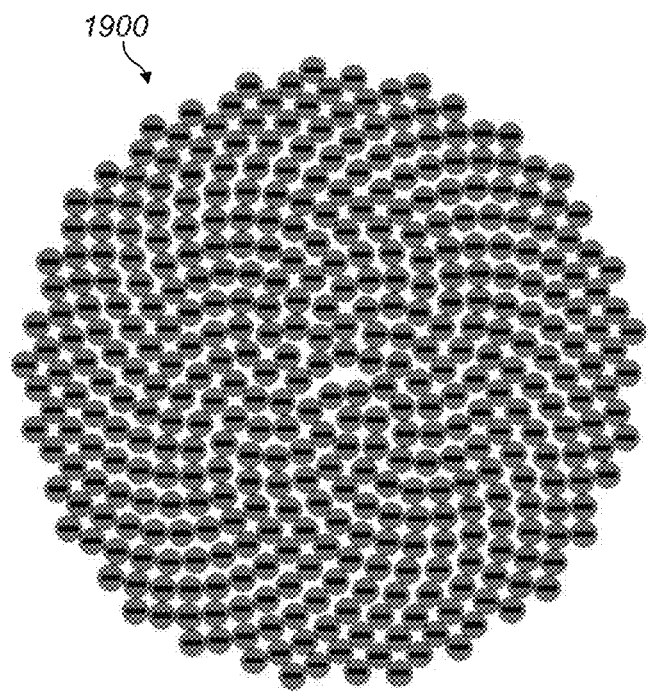
FIG. 19 shows an ideal layout of transducers in a phyllotactic spiral.
Figure 20:
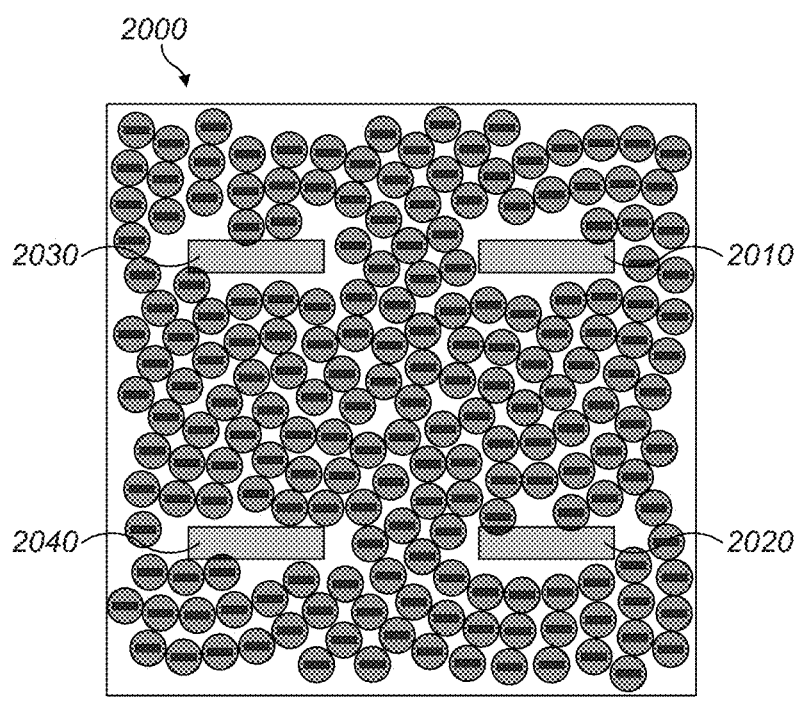
FIG. 20 shows an attempt to duplicate the layout of FIG. 19 in a real-world situation.

FIGS. 19 and 20 demonstrate the issues related to the ideal vs. real-world transducer layouts. FIG. 19 is the ideal layout of transducers 1900 in a phyllotactic spiral. FIG. 20 shows an attempt to duplicate this layout of transducers 2000 in a real-world situation.

Transducers must be contained within the footprint of the printed circuit board. FIG. 20 shows regions 2010, 2020, 2030, 2040 for four physical connector placements have been applied on top of the constraint for transducers. Thus in one example, the overall transducer count in FIG. 20 over the area of the board has dropped from 256 for a rectilinear layout (as in FIG. 1) in the same space to 179, representing a significant loss in power. There are also sizable regions 2010, 2020, 2030, 2040 devoid of transducers, which imply a loss of fidelity in the above acoustic volume. While this could be used as a starting point for further manual intervention in the placement of the transducer elements, this would be time consuming and would risk inadvertently compromising the optimal layout intended.

2. Physical Constraint Optimization

Transducer layout design may be better optimized for physical constraints through the use of a simulation of two-dimensional physics. Each electrical component in the simulation is comprised of multiple layers. In each layer, an object interacts with other physical bodies that reside on the same layer. For example, a transducer body may be modeled as a primitive shape on one layer. A different but rigidly-connected shape on a separate layer represents the electrical pins connection beneath the transducer. In the above example, the transducer bodies interact with each other and with the edges of the printed circuit board. In contrast, the shapes that model the transducer pins interact only with the physical board connectors to ensure there is enough space to physically place the connector. Thus, the location of the component as a whole is optimized using the simulation of a physical process.

3. Simulation Behaviors that Enhance Design

A simulator (whether in hardware, software or both) configured to provide a physical simulation of such a constrained system may be used to provide an intuitive design tool for transducer placement tasks. The challenge is that the fulfillment of positive constraints is required in the face of a desired placement of components which violates negative constraints. Such an approach yields readily intuited results satisfying these constraints while attempting to give the closest placement to the ideal of any given component. The end goal of this effort is to design and deliver an efficient real-world layout of transducers on a circuit board.

The physical process may be envisioned as, for example, a repulsive force field between elements that spreads the components evenly and/or each component represented as a rigid body. These elements may be connected to their preferred locations by constraints that correspond to an interpretation of physical springs. In this way, the physical configuration in which the "springs", positive constraints, are most relaxed while continuing to obey other physical negative constraints such as shape occlusion provides a comprehensive metaphor for component placement on a circuit board.

A rigid body simulation is one example of a physical simulation system that can be configured to yield metaphors for these constraints. The simulation of each component as a rigid body then prevents shape occlusion, as two rigid bodies may not occupy the same space at the same time. The simulator may also be used to apply a restraining force to each component in the design. This is intended to keep the components as close to the pre-calculated and ideal positions as possible. Deviation from the ideal positions results in an increased restoring force. This may be envisioned and modeled as a spring pulling the component towards the ideal location. At a predefined point, the spring may be configured to break, resulting in the deletion and possible relocation of the component.

Once the initial placement of the components, which may be automated, is complete the simulation is moved forward in time. As the simulation moves forwards in time, springs will constrict, which may pull components into better positions, while other constraints may push components away from their various preferred locations. Over time, the actions of these opposing forces will allow the board design to settle into a more optimized configuration that can be exported from the process. This may be repeated multiple times, or as a single step in a longer design process in order to obtain an effective circuit board design.

FIG. 21 shows a left layout 2100 with an initial arrangement of initial transducer placements 2112, 2114, 2116 overlaid over simulated final transducer placements 2111, 2113, 2115. In the center layout 2120, a rectangular component-free zone 2121 forces the transducers apart from their initial transducer placements 2112, 2114, 2116 and forces the simulated final transducer placements 2111, 2113, 2115 to move locations. The connection between the initial transducer placements 2112, 2114, 2116 and the simulated final transducer placements 2111, 2113, 2115 are modeled using respective springs 2122, 2123, 2124.

In the right layout 2130, the left-most transducer 2115 is removed because the expanded rectangular component-free zone 2132 forces the distance from the leftmost initial transducer placement 2116 to the simulated final transducer placement 2115 to be too large. This causes the spring to break 2131 and thus the simulated final transducer placement 2115 is removed from the layout.

FIG. 22 shows a similar situation with the difference that the "offending" transducer is moved within the array rather than removed entirely. The left layout 2210 shows five simulated final transducer placements 2211, 2212, 2213, 2214, 2215 without a component-free zone (the initial transducer placements are not shown). The center layout 2220 shows the effect of a component-free zone 2235 on transducer placement. Here, the connection between four initial transducer placements 2221, 2223, 2224, 2225 and the simulated final transducer placements 2211, 2213, 2214, 2215 are modeled using respective springs 2226, 2227, 2230, 2229. The movement of these four transducers is necessitated by the component-free zone 2235. The movement of the middle-left transducer 2212 necessitated by the component-free zone 2235 is too far, thus breaking spring 2228. This motivates moving the middle-left transducer to a position 2222 on the other side of the array.

As shown in the right layout 2240, the former middle-left transducer 2212 is moved to position 2222 on the other side of the array and a spring 2231 is used to model its placement with respect to the component free zone 2235. The rest of the elements in the right layout 2240 are the same as the center layout 2220.

Abruptly applying constraints to the component layout may create uncertainty due to physical constraints being immediately and sharply violated. To alleviate this, constraints and components may be made to move and expand slowly into position. This physical interpretation allows components to slowly adopt a position as a natural result of the simulation. FIG. 23 shows in a left layout 2310 showing an initial transducer arrangement 2315. In the center layout 2320, a small component-free zone 2312 is shown that forces the transducer arrangement 2325 to be somewhat realigned. In the right layout 2330, an expanded component-free zone 2335 is shown that forces the transducer arrangement 2340 to be significantly realigned.

FIG. 24 shows a left layout 2410 with small components 2411, 2412, 2413. In the center layout 2420 there are expanded components 2421, 2422, 2423. In the right layout 2430 the final size components 2431, 2432, 2433 naturally arrange themselves using spring constraints.

The simulation may also be interactive by allowing for the dynamic creation and deletion of components. These components are also physically simulated and this interactivity enables an element of human control over the placement process. In these cases, both the immediate component position and the anchoring location of its associated spring constraint may be modified.

Figure 25:
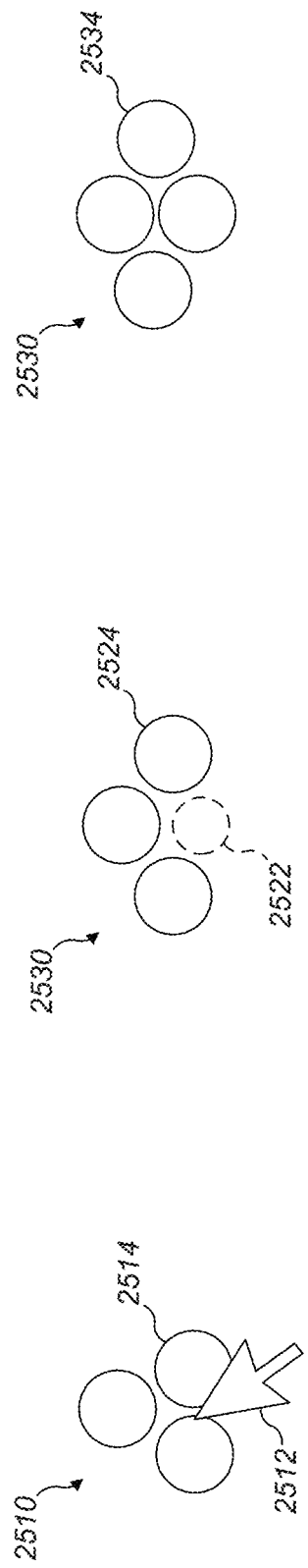

FIG. 25 shows a left layout 2510 with a set of components 2514 where a new component is being added by user input 2512. The center layout 2520 shows the initial new component 2522 being created within the other components 2524 that have moved to accommodate. The right layout 2530 shows the new layout of all components 2534.

Figure 26:
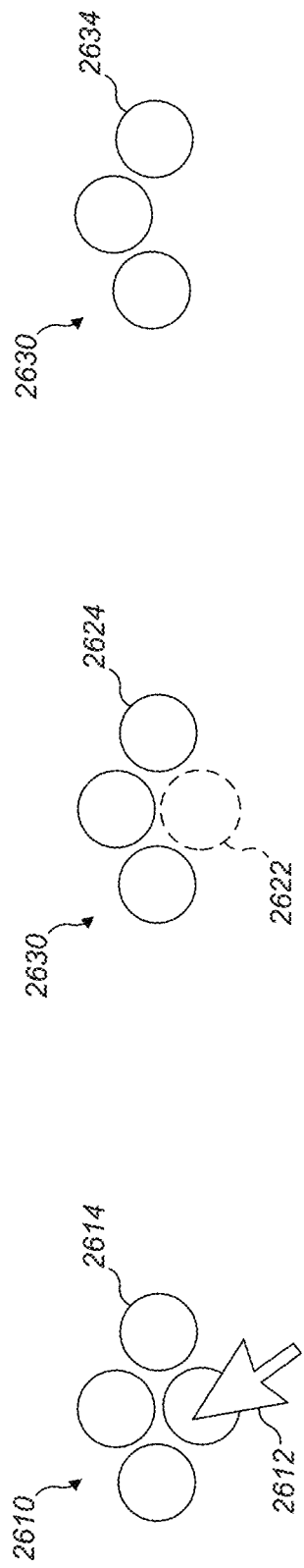

FIG. 26 shows a left layout 2610 with a set of components 2614 where a new component is being removed by user input 2612. The center layout 2620 shows the to-be-removed component 2622 being removed among the other components 2624. The right layout 2630 shows the layout of the remaining components 2634.

Figure 27:
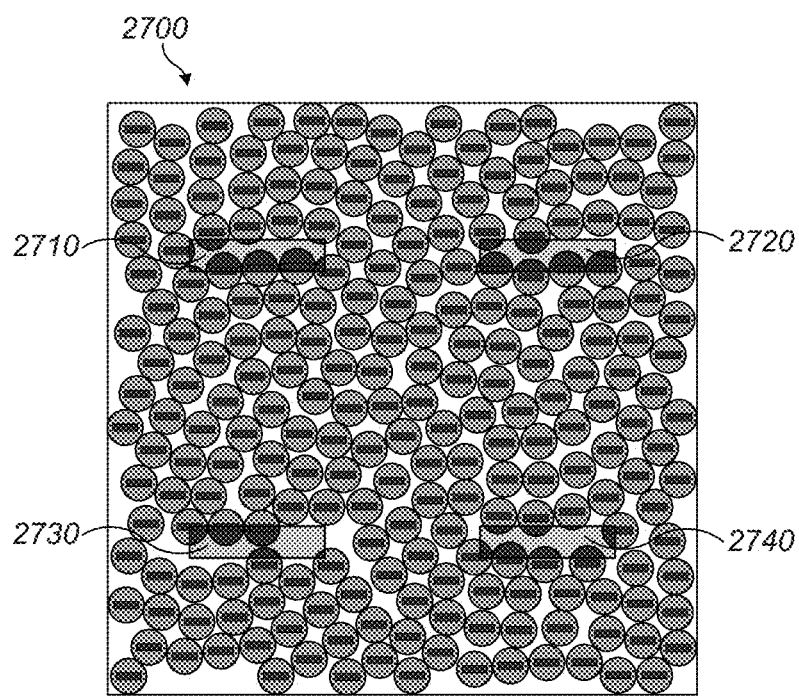
FIG. 27 shows an improved attempt to duplicate the layout of FIG. 19 in a real-world situation.

An example of a layout improved using the foregoing methods is shown in FIG. 27. The component layout 2700 results in a total component count of 237 compared to 179 components in FIG. 20 above. As a result of the more efficient layout, regions 2710, 2720, 2730, 2740 are no longer empty but include numerous components.

III. CALIBRATION OF ARRAYS USING LEVITATING FIDUCIALS

1. Levitation as an Input Calibration Step

The levitation of objects such as polystyrene beads, is possible using the acoustic field produced above the array. It has been shown that an optimization may be employed to generate a levitation point at which a small object can be trapped. (Marzo et al., Holographic acoustic elements for manipulation of levitated objects, Nature Communications 6:8661 (2015)). A levitation point may be created in a manner similar to a control point and at a predictable sub-wavelength offset from an equivalent control point that can be created at the same position. The object can then be sensed using the same sensor as the input, which could for example be a camera. This object may be then used as a fiducial marker floating in free space. This fiducial object may provide a correspondence between the input coordinate space of a sensing device capable of spatial tracking and the acoustic output coordinate space.

Once a bead is trapped at a levitation point, the levitation point may be slowly moved in a similar fashion to a control point. As the levitation point moves around the acoustic volume above the array, the correspondence between the acoustic output space and sensor input space is refined. In order to provide sufficient sensor calibration, the object must move through all three dimensions, registering correspondences between input and output space through time. An example path for the object might be between the vertices of a tetrahedron floating above the array. The system may be operated without human intervention if an acoustically transparent structure holds the fiducial in a predefined initial position so that the array can grip and levitate the object.

2. Levitation as an Output Calibration Step

If the correspondence between the input sensor space and the objective measurement of position is known, then the levitating object may be used to calibrate the output space of the array. As the formation of a levitation point is similar to the formation of a control point, the former may be used to measure the way in which the acoustic assumptions hold across the acoustic volume. This may be used to ascertain whether the positions to which the array focuses are correct and enable the computation of a correction factor in the event that the focus has been linearly or non-linearly transformed in space. Both the input and the output calibration steps may be performed at the same time.

V. CONCLUSION

The various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. An apparatus comprising:
a transducer array having a plurality of transducers with known relative positions and orientations to generate a mid-air acoustic field;
at least one control point, wherein each of the at least one control points has a known spatial relationship relative to the transducer array;

wherein the plurality of transducers generate the mid-air acoustic field at desired amplitudes at the at least one control point;

wherein at least a portion of the plurality of transducers is arranged as a phyllotactic spiral pattern; and wherein first ghost images produced by the transducer array are less than second ghost images, wherein the second ghost images are produced by the transducer array if all of the plurality of transducers were rearranged as a rectilinear array.

2. The apparatus as in claim 1, wherein the arrangement of the at least a portion of the plurality of transducers as a phyllotactic spiral pattern is of approximately uniform density.

3. The apparatus as in claim 1, wherein the arrangement of the at least a portion of the plurality of transducers as a phyllotactic spiral pattern is sparser toward the edges of the phyllotactic spiral pattern.

4. The apparatus as in claim 1, wherein the plurality of transducers includes a first transducer having a first orientation and a second transducer having a second orientation, and wherein the first orientation is not equal to the second orientation.

5. The apparatus as in claim 4, wherein the differential between the first orientation and the second orientation is approximately 90 degrees.

6. The apparatus as in claim 1, wherein the arrangement of the at least a portion of the plurality of transducers as a phyllotactic spiral pattern comprises an expanded phyllotactic spiral array.

7. The apparatus as in claim 1, wherein operation of the transducer array results in an intended image with de-correlated noise at an amplitude level close to the at least one control point output.

8. The apparatus as in claim 1, wherein at least two of the portions of the plurality of transducers are arranged in a frame format.

9. The apparatus as in claim 8, wherein at least one of the transducers are pointing at an approximately 45-degree angle.

10. The apparatus as in claim 1, wherein at least two of the portions of the plurality of transducers are arranged in a rectilinear format.

11. An apparatus comprising:

a transducer array having a plurality of transducers with known relative positions and orientations to generate a mid-air acoustic field;

at least one control point, wherein each of the at least one control points has a known spatial relationship relative to the transducer array;

wherein the plurality of transducers generate the mid-air acoustic field at desired amplitudes at the at least one control point;

wherein at least a portion of the plurality of transducers is arranged as a golden ratio-based phyllotactic spiral pattern; and wherein first ghost images produced by the transducer array are less than second ghost images, wherein the second ghost images are produced by the transducer array if all of the plurality of transducers were rearranged as a rectilinear array.

12. The apparatus as in claim 11, wherein the arrangement of the at least a portion of the plurality of transducers as a golden ratio-based phyllotactic spiral pattern is of approximately uniform density.

13. The apparatus as in claim 11, wherein the arrangement of the at least a portion of the plurality of transducers as a golden ratio-based phyllotactic spiral pattern is sparser toward the edges of the phyllotactic spiral pattern.

14. The apparatus as in claim 11, wherein the plurality of transducers includes a first transducer having a first orientation and a second transducer having a second orientation, and wherein the first orientation is not equal to the second orientation.

15. The apparatus as in claim 14, wherein the differential between the first orientation and the second orientation is approximately 90 degrees.

16. The apparatus as in claim 11, wherein the arrangement of the at least a portion of the plurality of transducers as a golden ratio-based phyllotactic spiral pattern comprises an expanded golden ratio-based phyllotactic spiral array.

17. The apparatus as in claim 11, wherein operation of the transducer array results in an intended image with de-correlated noise at an amplitude level close to the at least one control point output.

18. The apparatus as in claim 11, wherein at least two of the portions of the plurality of transducers are arranged in a frame format.

19. The apparatus as in claim 18, wherein at least one of the transducers are pointing at an approximately 45-degree angle.

20. The apparatus as in claim 11, wherein at least two of the portions of the plurality of transducers are arranged in a rectilinear format.

* * * * *